United States Patent [19]

Nambu

[11] Patent Number: 4,664,857

[45] Date of Patent: * May 12, 1987

[54] PROCESS FOR PREPARING A HYDROGEL

[75] Inventor: Masao Nambu, Yokohama, Japan

[73] Assignee: Nippon Oil Company, Limited, Japan

[*] Notice: The portion of the term of this patent subsequent to Sep. 18, 2001 has been disclaimed.

[21] Appl. No.: 749,127

[22] Filed: Jun. 27, 1985

Related U.S. Application Data

[63] Continuation of Ser. No. 344,006, Jan. 29, 1982, abandoned.

[30] Foreign Application Priority Data

Feb. 5, 1981 [JP] Japan ............................ 56-15009
Feb. 5, 1981 [JP] Japan ............................ 56-15010
Mar. 30, 1981 [JP] Japan ............................ 56-45439

[51] Int. Cl.$^4$ ............................................. B29C 35/16
[52] U.S. Cl. ........................................ 264/28; 264/101; 264/102
[58] Field of Search .......................... 264/28, 101, 102

[56] References Cited

U.S. PATENT DOCUMENTS

| 4,305,502 | 12/1981 | Gregory | 264/28 |
| 4,472,542 | 9/1984 | Nambu | 264/28 |

FOREIGN PATENT DOCUMENTS

| 52-001134 | 1/1977 | Japan | 264/28 |
| 52-008071 | 1/1977 | Japan | 264/28 |
| 55-071532 | 5/1980 | Japan | 264/28 |
| 56-25211 | 6/1981 | Japan . | |
| 56-25210 | 6/1981 | Japan . | |

OTHER PUBLICATIONS

"Fragrance Journal" (Japan) 2(7)68(1974).
Japanese Patent Publication No. 12854-1972 (English Translation).
Japanese Patent Publication No. 8071/77 (English Translation).
Partial Translation of Japanese Patent 52008-71.

*Primary Examiner*—James Derrington
*Attorney, Agent, or Firm*—Scully, Scott, Murphy & Presser

[57] ABSTRACT

A hydrogel which has a water content of 20 to 92 weight % and which is stable and superior in mechanical properties is obtained by preparing a 3 to 25 weight % aqueous solution of a polyvinyl alcohol having a degree of hydrolysis not less than 95 mol % and a viscosity-average polymerization degree of not less than 1,500, then pouring the aqueous polyvinyl alcohol solution into a desired shape of a vessel or a mold, then freeze-molding the aqueous polyvinyl alcohol solution at a temperature lower than −6° C., thereafter dehydrating the molded article without thawing it until the dehydration percentage reaches 5 weight % or more and, if required, immersing the dehydrated product in water.

12 Claims, No Drawings

PROCESS FOR PREPARING A HYDROGEL

This application is a continuation, of application Ser. No. 344,006, filed Jan. 29, 1982 now abandoned.

BACKGROUND OF THE INVENTION

The present invention relates to a process for preparing a synthetic hydrogel and more particularly to a process for preparing a hydrogel from a polyvinyl alcohol which hydrogel has superior characteristics not observed in conventional natural or synthetic hydrogels.

Hydrogels (hydrous gels) are considered to be very promising materials because they have high water content, a high substance permeability and are soft to the feel. But their use is extremely limited because they have a serious drawback such that they are inferior in mechanical strength. There have been proposed various hardening means (strength improving means) wherein hydrogels (or gelling components) inferior in mechanical strength are treated with formaldehyde, glutaraldehyde, terephthalaldehyde or hexamethylenediamine. But these chemical treatments use reagents which arh harmful to organism, so the use of the treated hydrogels would cause various troubles.

Moreover, the aforesaid chemical treatments usually cause a great deterioration of the superior characteristic (high water content) of hydrogels, so it is impossible to expect much from such treatments. Therefore, the irradiation method is expected as the only method for hardening weak hydrogels [see N. A. Peppas et al., J. Biomed. Mater. Res., 4, 423 (1977) and H. Singh et al., J. Sci. Ind. Res., 39, 162 (March 1980)].

However, the irradiation method not only requires a special equipment but also its effect is not so remarkable, and therefore, in general, its practical application is difficult. By the application of radiation, moreover, the superior characteristic of hydrogels is often lost (or deteriorated).

Furthermore, since a high molecular weight compound embedded (entrapped) in the interior of a hydrogel is gradually released to the exterior of the hydrogel, hydrogels are taken note of also as a release control (slowly releasing) material for medicines, agricultural chemicals, fertilizers, perfumes and fishing baits. For example, various attempts are well known, such as the embedding of dibucaine (a local anesthetic) and sulfamethizole into agar and devil's tongue jelly [see Masahiro Nakano, Kagaku to Kogyo, 32, 569 (1979) and Maku (Membrane), 3 (6) 386 (1978)], the embedding of aromatic components into carrageenan, etc. [see CMC Technical Report No. 6, p.184 (1980)], the embedding of pilocarpine (a glaucoma treating medicine) into poly(ethylene - vinyl acetate) or collagen [see U.S. Pat. No. 3,618,604 (1971) and A.L. Rubin et al., J. Clin. Pharmacol., 13, 309 (1973)], and the embedding of fluorouracil (a carcinostatic agent) into poly(2-hydroxyethylmethacrylate) [see M. Arlen et al., Arch. Surg., 105, 100 (1972)]. However, not to mention agar and carrageenan, it goes without saying that also with respect to many other hydrogels, their weakness are often pointed out and cause troubles in practical use.

Hydrogels are hydrous and have a high permeability for low molecular weight substances. Besides, they can contain (capture) giant molecules or their aggregate. Therefore, hydrogels are expected also as an embedding (immobilizing) material for active carbon or physiologically active substances such as enzymes. There are also well known the embedding of active carbon into gelatin, poly(2-hydroxyethylmethacrylate) (adsorption type artificial kidney) [see J. D. Andrade et al., Trans. Am. Soc. Art. Int. Organs, 18, 473 (1972); B. G. Gazzard et al., The Lancet, 29, 1301 (1974); Nobuo Nakabayashi, Kobunshi Ronbunsyu, 34, (4) 317, 323 (1977)], the embedding of enzyme into collagen (enzyme membrane, enzyme electrode) [see Karube and Suzuki, Kagaku Kogaku, 40, 139 (1976)]. However, because the gels are weak or fragile, it has often been pointed out that the gels are cracked or the embedded matters leak out.

The present invention is the first to provide a method of obtaining hydrogels superior in mechanical strength without using any of these chemicals or radiation.

The present invention uses a polyvinyl alcohol as a starting material for the preparation of a hydrogel. As to the method of gelling a polyvinyl alcohol (hydrogel preparing method), there have already been proposed many methods. But, as will be summarized below, all of these methods involve problems in point of operation or in the properties of product.

(1) By air-drying an aqueous polyvinyl alcohol solution there is obtained a wet or dry film, which, however, is a mere weak film inferior in water-resisting property and having no integrity in water and is used merely in limited applications (see Japanese Patent Publication No.9523/1965).

(2) Also by adding an acid into an aqueous suspension containing water soluble polymers and tetraethyl silicate to produce composite sol then followed by air-drying, there merely is obtained the same film as in the above (1). In this connection, it has also been proposed to add an acid into the aqueous suspension to produce composite sol followed by freeze-drying. But the resultant film rather deteriorates in its strength and is scarcely moldable (see Japanese Patent Puhlications Nos.30358/1980 and 11311/1980).

(3) The gelling method involving application of cobalt 60 ($\gamma$-ray) to an aqueous polyvinyl alcohol solution is well known. In this case, however, not only a special equipment (irradiation equipment) is essential and the irradiation cost is high, but also the resultant gel is weak and often requires an additional hardening means (secondary hardening treatment). Therefore, the gel obtained by this method is difficult to be utilized except in special applications wherein a highly viscous liquid (or a soft gel) is desired such as an artificial vitreous body (intra-eyeball filling liquid) (see J. Material Sci., 1974, 1815 and Japanese Patent Laid Open No. 55647/1975).

(4) Also, it has long been well known that an aqueous polyvinyl alcohol solution gels upon mixing with boric acid (or an aqueous boric acid solution) or with borax (or an aqueous borax solution) (Note: borax=sodium tetraborate decahydrate). However, the resultant gel is weak and has fluidity; besides, it is torn immediately when picked up with finger tips, so it is difficult to retain its shape after molding [see J. Am. Chem. Sci., 60, 1045 (1938) and French Pat. No. 743942 (1933)].

Moreover, although this borax gel can exist in an alkaline condition, it collapses easily at a pH value not more than 8. Therefore, this borax gel is difficult to be utilized except in special applications.

(5) It is also well known that gel is formed by adding a very small amount (0.1–0.2 wt. %) of polyvinyl alcohol to kaolin (kaolinite) or bentonite. On the basis of this principle, an attempt to modify the surface soil of a stadium into a soil from which dust is relatively difficult to rise by scattering a polyvinyl alcohol (a dilute aqueous solution) over the said surface soil, an attempt to improve the water permeability or water retaining property of the soil of fields by scattering a small amount of polyvinyl alcohol (a dilute aqueous solution) over the fields, and the technique of promoting the flocculation and precipitation of clay (colloidal particles) in a muddy water by adding a small amount of polyvinyl alcohol into the muddy water, are also well known. However, the gels formed in these cases are very fragile (difficult to distinguish from a mere soil in external appearance) and collapse very easily even in the state of dry powder, not to mention in water [see J. Agr. Sci., 47, 117 (1956)].

(6) There have also been proposed various methods of gelling a polyvinyl alcohol using phenols such as phenol, naphthol and Congo Red or amino compounds or metallic compounds such as titanium, chromium and zirconium compounds. In all of these methods, however, the same drawbacks as in the foregoing (4) are encountered [see Nippon Kagaku Zasshi, 72, 1058 (1951) and Japanese Patent Publication No.23204/1965].

(7) It is also well known to gel a polyvinyl alcohol using cross-linking agents or copolymer components such as aldehydes, dialdehydes, unsaturated nitriles, diisocyanates, trimethylolmelamine, epichlorohydrin, bis-($\beta$-hydroxyethyl)sulfone, polyacrylic acid, dimethylolurea and maleic anhydride. In this case, however, not only a procedure using chemical reagents is needed, but also it is difficult to obtain a strong gel of a high water content [see Textile Res. J., (3), 189 (1962) and British Pat. No.742,900 (1958)].

(8) Also, it has long been well known to gel an aqueous polyvinyl alcohol solution by allowing it to stand at a low temperature not higher than 40° C., particularly not higher than 5° to 18° C. [see Kominami et al., Kobunshi Kagaku, 12, 218 (1955), Maeda et al., Kobunshi Kagaku, 13, 193 (1956), and Kogyo Kagaku Zasshi, 59, 809 (1956)].

However, gels formed at room temperature or thereabout are fragile like agar and carrageenan. Besides, they are dissolved on stirring merely vigorously or with water added or on warming a little [see Kominami et al., Kobunshi Kagaku, 12, 218 (1955), and Takahashi and Sakurada, Kobunshi Kagaku, 13, 502 (1956)].

It is also well known that low temperatures are preferable to obtain a cooled gel of an aqueous polyvinyl alcohol solution. For example, there is known an example in which the cooled gel is formed at 18° C. or even at 0° C. or lower [see Maeda et al., Kobunshi Kagaku, 13, 193 (1956), Japanese Patent Publication No.12854/1972, and Takahashi et al., Polymer J., 6, 103 (1974)].

However, the gels thereby obtained are weak gels (or viscous liquids) like agar, carrageenan or jelly and are very sticky. In addition, those gels are inferior in water-resisting property. Under water, they swell to a remarkable extent and soften, a part of which is dissolved out into water and the remainder becomes paste-like. Furthermore, under water or in a warm water at 40°–50° C., those gels rapidly get out of shape and disperse and dissolve in water. Because of these drawbacks, their use are extremely restricted inevitably.

(9) It is also known to add a small amount of polyvinyl alcohol into aqueous solutions of water-soluble high polymers having a gelling capacity such as agarose, albumin, alginate, curdlan, carrageenan, casein, CMC (sodium carboxymethyl cellulose), furcellaran, gelatin, methyl cellulose, pectin, starch, tamarind gum, xanthan gum, tragacanth gum and guar gum, and then let cool the resulting solutions, or immerse the solutions into a gelling agent-containing bath (coagulation bath), or freeze-dry the solutions [see Fragrance Journal (Japan) 2, (7) 68 (1974) and Japanese Patent Publication Nos.25210/1981 and 25211/1981]. However, even by such a method there merely is obtained a weak, less water-resistive, viscous liquid or non-fluid gel. or a water-soluble, dry powder (freeze-dried powder).

SUMMARY OF THE INVENTION

It is an object of the present invention to overcome the foregoing disadvantages of the prior arts.

It is another object of the present invention to provide a novel hydrogel which is water-insoluble and which is very elastic and mechanically strong and is stable over a long period, and also to provide a process for preparing the same.

Other objects and advantages of the present invention will become apparent from the following description.

The above-mentioned objects of the present invention are attained by the steps: preparing a 3 to 25 weight % aqueous solution of a polyvinyl alcohol having a degree of hydrolysis not less than 95 mol % and a viscosity-average polymerization degree of not less than 1,500, pouring said aqueous polyvinyl alcohol solution into a desired shape of a vessel or a mold, freeze-molding said poured aqueous polyvinyl alcohol solution at a temperature lower than −6° C., vacuum-dehydrating the resulting molded article without thawing it up to a dehydration percentage (percentage reduction in weight of the frozen body) of not less than 5 weight % and thawing said dehydrated article.

In the process of the present invention clay minerals may be made co-existent in an aqueous solution of a polyvinyl alcohol.

According to the present invention, a hydrogel having a high mechanical strength and a high water content is obtained in any desired shape by freeze-molding an aqueous polyvinyl alcohol solution or an aqueous suspension containing a polyvinyl alcohol and clay minerals and then partially dehydrating the molded article. In the gelling step and in the pre-treating step for the gelation, the present invention does not use any of acids, alkalies, radical source, radiation, organic solvents, reagents and inorganic solvents except water which have heretofore been used commonly in the gelation of synthetic high polymers. Furthermore, a secondary hardening treatment (after-treatment) is not needed, either. Besides, the gel obtained according to the present invention is porous and has a high water content, a rubbery elasticity and a high mechanical strength.

It has long been well known that an aqueous polyvinyl alcohol solution often gels on storage for about one day to about one week at 0° to 30° C. But the gel thus formed is fragile like agar, and what is worse, it dissolves on stirring merely vigorously or with water added or on warming a little. On the other hand, the gel of the present invention is insoluble in water or warm water and thus is quite different from the aforesaid conventional gel.

It is further well known that a hard film is obtained by adding a clay into an aqueous polyvinyl alcohol solution and heat-drying the resulting aqueous suspension. But the film thus formed is inferior in water absorbing property. This means that the present invention provides a novel gel having function and effect quite different from those in the conventional gelation by chemical treatment of an aqueous polyvinyl alcohol solution.

DETAILED DESCRIPTION OF THE PREFERRED EMBODIMENTS

It is essential that the degree of hydrolysis of polyvinyl alcohols used in the present invention be not less than 95 mol %, preferably not less than 97 mol % and more preferably not less than 98 mol %. Even if polyvinyl alcohols having a degree of hydrolysis in the range of from 80 to 88 mol %, particularly 85 mol % or less, are used, there are obtained only weak gels, and therefore the objects of the present invention are not attainable.

Polyvinyl alcohols used in the present invention are required to have a viscosity-average polymerization degree of not less than 1,500. At lower polymerization degrees there are formed only weak gels. In the present invention, there may be used polyvinyl alcohols having a polymerization degree in the range of 1,500 to about 3,300, preferably not less than 1,800, but it is recommended to use commercially available products of high polymerization degrees (1,800–2,600) as they are.

According to the process of the present invention, first an aqueous solution of a polyvinyl alcohol is prepared. The concentration of polyvinyl alcohol is 3 to 25, preferably 6 to 25 and more preferably 7 to 15 weight %. The concentration of polyvinyl alcohol can be further increased up to say 90%, but in this case the viscosity of the auqeous solution at room temperature reaches as high as 10,000 cP or more, or the aqueous solution in storage may undergo an increase in its viscosity, or its gelation may take place. Therefore, its handling is a little difficult. In case of lower concentrations than 3 weight %, it would prolong the time required for dehydration (drying) and cause an increase in the cost (cost of dehydration power) and there are obtained only weak gel.

In the case of using clay minerals together with polyvinyl alcohol, the concentration of the polyvinyl alcohol may be made somewhat lower, e.g. 1–15 wt. %.

As clay minerals there may be used laminated structure type clay minerals having a three-layer type (2:1 type) composite layer as a basic unit.

In case clay minerals are to be used together with polyvinyl alcohols, the amount of the polyvinyl alcohol should be not less than one-fifth of the amount of the clay minerals as will be described later (that is, the amount of the clay minerals should be not more than five times and preferably not more than three times the amount of the polyvinyl alcohol). If this proportion is smaller than one-fifth, for example, if it is one-tenth, the resulting gel will be inferior in its mechanical strength. In the soil improvement as referred to in the previous discussion, the mixing ratio (by weight) of polyvinyl alcohol to clay minerals is 1/1,000 to 1/100, but under such a condition the gel of the present invention will never be obtainable.

Clay minerals used in the invention are laminated structure type clay minerals having a three-layer type (2:1 type) composite layer as a basic unit, typical of which are montmorillonite, vermiculite, illite, pyrophyllite and talc. Bentonite, which is known as a general clay, is inexpensive and that easily available. It is an aggregate of colloidal particles consisting mainly of montmorillonite produced by the weathering of tuff, rhyolite, etc. in various districts of Japan such as Hokkaido, Akita, Yamagata, Niigata, Gunma and Shimane. Montmorillonite as the main component of bentonite is also called smectite and it is of a laminated structure having a three-layer (2:1 type) composite layer as a basic unit consisting of silica (tetrahedral structure), alumina, i.e. gibbsite, (octahedral structure) and silica (tetrahedral structure). Besides, a part of aluminum which constitutes the composite layer is substituted by magnesium, and among the layers there exists water and cations such as sodium, potassium, calcium, lithium, strontium, barium, aluminum, cesium, magnesium, ammonium or hydrogen. Typical structure of montmorillonite is represented, for example, by $(Al^5/_3Mg^1/3)Si_4O_{10}(OH)_2XH_2O(K, Na, Ca, H, NH_4, Mg, Al, Li, Cs, Sr, Ba)_y$.

As homologues obtained by substituting the main constituent elements (aluminum and silicon) of this composite layer by other elements, there are well known nontronite (iron-substituted), hectorite (magnesium-substituted), saponite (magnesium-substituted) sauconite (iron-, magnesium- and zinc-substituted), and volkonskoite (chromium-substituted). These are also called montmorillonite group minerals and are often found in the foregoing bentonite.

Bentonite contains about 50% to about 85% of montmorillonite and the foregoing montmorillonite group minerals. In addition, quartz, feldspar, zeolite, kaolin, illite (mica) and cristobalite are also mixed therein. Therefore, the composition (wt. %) of bentonite is not definite, but the following is a general composition: $SiO_2$ 42–65, $Al_2O_3$ 14–28, $H_2O$ 11–23, MgO 1–25, $Fe_2O_3$ 0–4, $Na_2O$ 0–3.5, CaO 0–3, $K_2O$ 0.1–0.7, $TiO_2$ 0–0.7, FeO 0–0.3, $P_2O_5$ 0–0.04.

The Pharmacopoeia of Japan defines tests concerning the swelling property of bentonite and its gel forming ability (porridge-like, composite magnesium oxide - bentonite gel forming ability), but the commercially available bentonite usually does not come up to this standard. In the present invention, however, even such a bentonite may be used as clay minerals without any trouble. Bentonite is often treated with an aqueous solution of sodium chloride, sodium hydroxide, sodium carbonate, sodium nitrate, ammonium hydroxide, sodium pyrophosphate, sodium hexametaphosphate (a low grade polymer of sodium metaphosphate), hydrochloric acid, sulfuric acid or citric acid in order to enhance its swelling property, dispersibility and specific surface area. In the present invention, it is not particularly necessary to treat bentonite in such a manner, but the so-treated bentonite may also be used without any trouble.

In the present invention, in addition to bentonite there may be used acid clay (kambara earth), active white earth, Fuller's earth, Florida earth and Georgia earth as montmorillonite clay minerals. These clay minerals contain fairly large amounts of kaolinite which belongs to neither montmorillonite nor montmorillonite-like three-layer type clay minerals as will be described later, and allophane which is regarded as a non-crystalline clay mineral. But the main components are montmorillonite group clay minerals.

In addition to montmorillonite group clay minerals, the following montmorillonite-like three layer type (2:1 type) clay minerals are also employable in the present invention. That is, pottery stones obtained in Nagasaki Prefecture (Goto Mine), Okayama Prefecture (Mitsuishi Mine) and Nagano Prefecture (Honami Mine, Maika Mine) of Japan contain pyrophyllite as the main component. These pottery stones are distinguished from montmorillonite clays in that their magnesium content is very low and they scarcely exhibit swelling property, but they resemble montmorillonite in that they are of a laminated structure having a three-layer type (2:1 type) composite layer of silica - alumina - silica as a basic unit.

Talc obtained in Hyogo, Okayama, Hiroshima, Yamaguchi and Nagasaki districts of Japan contains a small amount of aluminum and a specially large amount of magnesium, and in this point it is different from montmorillonite, but it also is of a laminated structure based on a three-layer type (2:1 type) composite layer of silica - alumina - silica.

Among the clays obtained in Kumamoto and Niigata districts of Japan there are found many illites, which are classified minutely into hydromica, glauconite, muscovite, mica, illite, etc. according to their content of iron, fluorine, magnesium, etc. All of these illites have large potassium contents and in this point they are distinguished from montmorillonite, but they are also three-layer type (2:1 type) clay minerals of silica - alumina - silica.

Vermiculite obtained in Brazil, America (Pennsylvania) and India have long been given attention also in Japan as "Hiru-Ishi" and "Hiru-Suna", but it is different from montmorillonite in that its magnesium content is high. However, vermiculite has a laminated structure based on a three-layer type composite layer consisting of silica (tetrahedron) - alumina and magnesia (octahedron) - silica (tetrahedron), and in this point it is similar to montmorillonite.

In addition to the foregoing theee-layer type clay minerals, any of which may be used in the invention, artificially prepared three-layer type clay minerals are also employable. For example, taeniolite obtained in South Greenland belongs to illites rich in potassium, fluorine and magnesium, but it is obtainable also by mixing and melting sodium fluoride, lithium fluoride, magnesium oxide and silicon dioxide. Such an artificially prepared taeniolite may be used in the invention.

In the present invention it is preferable that the foregoing three-layer type clay minerals be used as powder having a particle size not larger than 0.15 mm (100 mesh). The foregoing bentonite is convenient because usually the greater part thereof (50-95%) is occupied by fine particles of diameters smaller than 74 $\mu$m (200 mesh) and it is rich in crude clay components (0.2-2 $\mu$m) and fine clay components (below 0.2 $\mu$m). Talc is commercially available as 150-270 mesh (0.1-0.05 mm) powder for cosmetic use. In case 30 to 100 mesh (0.59-0.15 mm) granules of acid clay, active white earth, Fuller's earth, pyrophyllite, illite and vermiculite are used, there is the tendency that the mechanical strength of the resulting gel becomes non-uniform. Therefore, it is recommended to use those granules after pulverization to not less than 100 mesh, preferably not less than 150 mesh.

In the present invention, powder of the foregoing clay minerals is added and dispersed into the foregoing aqueous polyvinyl alcohol solution, or a suspension of clay minerals is prepared in advance and it is mixed into the foregoing aqueous polyvinyl alcohol solution. Furthermore, polyvinyl alcohol may be added and dissolved in the suspension of clay minerals.

In any case, the concentration ratio (weight ratio) of polyvinyl alcohol to clay minerals in the resulting aqueous suspension of polyvinyl alcohol and clay minerals should be not less than 1/5 as previously noted, that is, the concentration of clay minerals suspended should be not more than 5 times the concentration of polyvinyl alcohol. If larger amounts of clay minerals are used, as previously noted, the resulting gel tends to exhibit a lower mechanical strength, and this tendency is particularly remarkable in the case of using 10 times or more amounts of clay minerals with respect to polyvinyl alcohol. Three-layer type clay minerals, as long as they are not used in such excess amounts, contribute to both high water content and high mechanical strength of gels obtained in the present invention. Attaining such high water content and high mechanical strength has heretofore been considered to be a difficult problem incompatible with each other. In this point the clay minerals used in the present invention exhibit a unique effect which has heretofore not been anticipated. The contribution of those clay minerals is particularly remarkable when using three-layer type clay minerals in amounts of one-fifth to one-fifteenth of polyvinyl alcohol (that is, at concentration ratios of polyvinyl alcohol to clay minerals in the range of from 5/1 to 15/1).

In the present invention, the foregoing aqueous polyvinyl alcohol solution or a mixed aqueous suspension of polyvinyl alcohol and clay minerals is poured into a desired shape of a vessel or a mold and is freeze-molded. In this case, as a cooling agent there may be used, for example, a freezing mixture such as common salt - ice (23:77) ($-21°$ C.) or calcium chloride - ice (30:70) ($-55°$ C.), or dry ice - methyl alcohol ($-72°$ C.), or liquid nitrogen ($-196°$ C.), thereby cooling and freezing the aqueous solution or suspension to a temperature lower than $-6°$ C. If cooling is insufficient, the shape of gel obtained through a dehydration step as will be described later may not be in exact conformity with the desired shape, namely, the shape of the vessel or the mold into which the aqueous polyvinyl alcohol solution has been poured, and the resulting gel will be inferior in its mechanical strength. Therefore, an insufficient cooling is not desirable in the present invention. The use of liquid helium would permit cooling down to $-269°$ C., but it is not only uneconomical but also is not advantageous to the quality of the resultant gel. Practically, it is recommended to use a Freon refrigerator for cooling to, for example, $-20°$ to $-80°$ C. The cooling temperature affects the strength of gel obtained through a dehydration step as will be described later. In case it is desired to attain a particularly strong rubber elasticity, cooling temperatures not higher than $-20°$ C., for example, in the range of $-20°$ to $-55°$ C., are preferred. At cooling temperatures in the range of $-6°$ to $-20°$ C., the strength of gel is somewhat deteriorated.

In the freeze-molding according to the present invention the aqueous solution is solidified (frozen) and molded within a desired shape of a mold, then the upper cover or lower cover (or both covers) of the mold is removed and the molded article is subjected to freeze-dehydration while keeping its shape (without thawing). Adoption of the freeze-dehydration method is advantageous in that the molded article can be dehydrated to its deep portion nearly uniformly and that rapidly. In the present invention, therefore, the freeze-molding step is very important. Besides, the execution of freeze-molding at low temperatures brings about a quite unexpected effect such that it contributes to the improvement of mechanical strength of the resultant gel. Also in this point, the freeze-molding in the present invention is of great significance.

As previously noted, the foregoing aqueous polyvinyl alcohol solution can be poured into a desired shape of a vessel or a mold, but in order to obtain a thin filmy gel effectively, it is preferable that the aqueous polyvinyl alcohol solution or a mixed aqueous suspension of polyvinyl alcohol and clay minerals as previously exemplified be poured and applied onto the surface of a projections-disposed plate followed by freeze-molding. If the aqueous solution or suspension is applied onto a plate having no projections on the surface thereof followed by the application of freeze-molding and subsequent vacuum-dehydration, gel is formed, but a highly dehydrated hard film having a water content of not higher than 20 weight % is apt to be formed because the freezing and drying of a thin-layer sheet (film) when dehydrated to excess contracts about 5% to 20% in the planar direction, so it is difficult to obtain a uniform and smooth dried surface, thus resulting in that there occurs inconvenience in the subsequent shaping operation, including cutting operation. These drawbacks can be overcome by ensuring a residual water content of not less than 20 wt. % (20-92 wt. %). However, as previously noted, because the drying of a thin-layer sheet (film) proceeds relatively rapidly and because damages to gel (deterioration of water absorbing property and of elasticity, planar shrinkage) caused by excessive dehydration is conspicuous particularly in the case of a thin-layer sheet (film), it is necessary to think out a countermeasure.

In some particular use of gel, moreover, with a view to attaining contact between gel and gas or liquid, it is desired to produce a perforated plate-like (reticulately molded) gel different from a mere thin-layer sheet (film).

All of these problems can be solved by the freeze-molding - dehydration system using a projections-disposed plate. That is, if a projections-disposed plate is used, there is obtained a uniform and smooth dehydrated gel without causing shrinkage in the planar direction even when dehydration (drying) was done to excess, and a gel superior in all of wet strength, wet elasticity and water absorbing property is obtainable; in addition, it is possible to obtain a reticulate (perforated plate-like) molded gel having many flowing paths of gases and liquids.

As the projections-disposed plate there may be used a flat plate or a curved (corrugated) plate having 900 to 500,000 projections per square meter. If the density of projections is too low, an excessive drying would cause gel to crack or shrink, making it no longer possible to attain the effect of the present invention. Therefore, the distance between projections should be not more than 5 cm, preferably not more than 2.5 cm, and there should be not less than 900 projections, preferably not less than 2,500, projections per square meter. If the projection density is too high, the resultant molded gel will be deteriorated in its mechanical strength.

As to the thickness of projections, if it is too small, there is fear that gel will be torn off by the projections, and also in consideration of the durability for washing and repetitive use of this projections-disposed plate after its use, it is recommended that the thickness of projections be not less than 0.1 mm, preferably not less than 1 mm.

The height of projections is determined according to the thickness of a desired, molded gel. For example, it may range from 0.01 to 5 mm.

Those projections and the projections-disposed plate may be formed of any material typical of which are polyethylene, polypropylene, polystyrene, Teflon, steel, aluminum and cast iron.

The foregoing aqueous polyvinyl alcohol solution or mixed aqueous suspension of polyvinyl alcohol and clay minerals is poured or applied with a spatula or the like onto the surface of the projections-disposed plate. The application thickness should be 0.01 to 5 mm, preferably 0.1 to 3 mm, and it may reach the same height as the projections. In case the aqueous polyvinyl alcohol solution and the aqueous suspension of polyvinyl alcohol and clay minerals are subjected to freeze-molding and dehydration after their application onto the projections-disposed plate, their shrink percentages are 3-8% and 2-6%, respectively, and openings corresponding to the density of the projections are formed in the dried gel. It is to be noted, however, that if the aqueous solution or suspension is applied more thickly than the height of the projections, the object of forming openings (molding a perforated plate-like gel) is often unattainable.

Furthermore, in case the aqueous solution or suspension is applied beyond 1.3 times the height of the projections and the dehydration is made to the extreme degree, not only the object of forming openings is unattainable, but also the dehydrated gel often shrinks in the planar direction and its water absorbing property is deteriorated; as a result, the effect of the projections-disposed plate used in the present invention is almost lost. Therefore, even in the case where a perforated thin-layer sheet (film) is not aimed at, it is recommended that the application thickness be smaller than 1.3 times, preferably not larger than 1.2 times, the height of the projections. In the present invention, gel (freeze-molded gel) is fixed at a large number of projected points, so the shrinkage of gel in the planar direction (shrinkage by drying) is prevented. Rather, the gel is dehydrated in such a state that a tensile force is exerted between the gel fixing points, and this is presumed to induce the effect of the projections-disposed plate used in the present invention.

As to the cooling rate in the freeze-molding operation, a slow cooling at a rate of 0.1 to 7° C./min, or a rapid cooling at a rate of 7 to 1,000° C./min, may be applied.

In the present invention, the aqueous polyvinyl alcohol solution or the aqueous suspension of polyvinyl alcohol and clay minerals poured into a desired shape of a vessel or a mold is subjected to vacuum-dehydration after confirming that it was frozen. In this case, the frozen molding is taken out of a refrigerating room, then transferred into a vacuum-dehydration room and immediately dehydrated by means of suction (without thawing it) whereby the sample is cooled along with removal (sublimation) of water, so the frozen molding will never thaw even without special cooling from the exterior. Heating may be applied to the extent that the frozen molding does not thaw, whereby dehydration can be accelerated. That is, as long as the frozen molding is not thawed, the dehydration temperature is not particularly limited and it will not have a special influence upon the quality of gel. In this dehydration step, dehydration percentages of not less than 5% and further not less than 10 weight % are adopted. The upper limit of the dehydration percentage is not restricted. As shown in the following examples, even 93% may be adopted. For instance, the frozen molding may be dehydrated until the water content of the dehydrated molding reaches 1 to 10 weight %. As the dehydration proceeds, the strength of gel is remarkably enhanced and at the same time various properties such as non-stickiness and water-resisting property are improved also remarkably, so this partial dehydration treatment is essential to the present invention. The objects of the present invention can be fully attained by the aforesaid partial dehydration treatment without the need to effect drying to a sufficient extent as in the freeze-drying of injection fluids or freeze-drying of hydrous foods such as coffee, milk, fruit juice and noodles. Since the strength of gel is remarkably enhanced as the dehydration proceeds, the dehydration percentage can be selected according to the desired strength of gel.

Anyhow, this freezing and partially dehydrating treatment is essential to the present invention and has a very important significance, so its omission would never afford a non-fluid, non-sticky, highly hydrous and mechanically strong hydrogel as referred to herein.

On the contrary, when the frozen molding is thawed and thereafter vacuum-dehydrated or the aqueous polyvinyl alcohol solution is directly vacuum-dehydrated, the system vigorously bubbles, it is hardly possible to continue the operation, and even if the dehydration can be operated using a long period of time, the resulting gel is inferior in mechanical strength and becomes muddy.

The degree of vacuum in the vacuum-dehydration step of the present invention is not limited so far as the frozen water can be dehydrated. Usually, less than 10 mmHg, preferably less than 1 mmHg, more preferably less than 0.1 mmHg, can be adopted.

In the present invention, the freeze-molded and partially dehydrated article is then allowed to stand at room temperature to thaw it whereby there is obtained a gel rich in elasticity. In this case, either a slow thawing at a rate of 1°–3° C./min or a rapid thawing at a rate of 3°–1,000° C./min may be adopted. The melting point of gel obtained by allowing an aqueous polyvinyl alcohol solution to stand (to store) at 0°–30° C. is about 15°–29° C., while the melting point of gel obtained according to the process of the present invention is as high as not lower than 100° C., so a rapid thawing using warm water or warm air may be applied. But even the gel of the present invention dissolves in hot water, and at temperatures above 60° C. a hard film is rapidly formed on its surface. Therefore, a high temperature thawing must be avoided. It is desirable that the thawing be carried out at a temperature below 40°–50° C.

After this thawing operation, the gel can be removed easily from the supporting portion of the vessel or the mold. The gel of the present invention thus obtained can usually contain 20 to 92 % by weight of water. However, the gel having a low water content, for example, 1 to 20 wt. % is also obtainable. In water, the gel absorbs water and its water content reaches 50 to 95 wt. % (on a wet body basis), but the gel is still a strong elastic body. As a result of having observed through a scanning electron microscope, the interior of the gel proved to be very porous, and a solid phase (water-insoluble polyvinyl alcohol) and a liquid phase (aqueous phase) commingle each other. It is presumed that the interior of the gel is like a labyrinth of waterways. The width of the waterways range from about ½ to about 100 μm and these waterways meander continuously and complicatedly. Moreover, as is seen from the high water content of the gel, the greater part of the interior of the gel is occupied by holes (aqueous phase). This water content of the gel, though not so high as that of devil's tongue jelly (wet polysaccharide gel having a water content of about 97 wt. %), is similar to the water content (70–90 wt. %) of cells and the tissues of human beings and animals. Besides, in point of strength and elasticity, this gel by far surpasses polysaccharide gels such as devil's tongue jelly, agar, alginic acid, carrageenan, guar gum, locust bean gum, and agarose. Rather, it resembles the muscles of human beings and animals. Thus, the gel of the present invention contains a large amount of water, but it exhibits a strong elasticity, and when it is squeezed firmly, it is deformed for a moment, but immediately reverts to its original shape, and thus it does not get out of shape. Attaining both high water content and high mechanical strength has heretofore been considered to be a difficult problem incompatible with each other but the gel of the present invention, as mentioned above, has a high water content and a high strength. It is a novel gel quite different from conventional films obtained by air-drying an aqueous polyvinyl alcohol solution or from water-soluble gels formed when an aqueous polyvinyl alcohol solution is merely allowed to stand at 0°–30° C. as previously noted.

Even if pressure is applied to the gel of the present invention, the water contained therein scarcely oozes out. For example, when a compressive stress of 4 $kg/cm^2$ is imposed on gel with a water content of 90 wt. %, the amount of water oozed out (flowed out) is only 1% to 2% of the total amount of water contained therein. Thus, as is apparent from the fact that the gel of the present invention firmly retains a large amount of water, the apparent specific gravity of this gel is about the same as that of water. It barely precipitates in water.

The gel of the present invention has no stickiness. Even when about 10 g. of a gel which has been molded in the form of a plate (8 mm×8 mm×2 mm), a cylinder (inside dia. 3 mm, outside dia. 6 mm, length 6 mm) or a sphere (4 mm dia.) is stirred in 50 ml. of water for 40 days, the phenomenon of mutual adhesion or getting out of shape is not recognized at all. When the gel was immersed in tap water for a period of one year, it did not dissolve and its elasticity and strength did not change [This is in striking contrast to the case of devil's tongue jelly which when immersed in tap water for several days gets out of shape noticeably. Also, this is in striking contrast to the case of a mere cooled gel (frozen gel) of an aqueous polyvinyl alcohol solution which gel exhibits a high stickiness and is often in the form of a viscous liquid having fluidity or at most in the form of jelly, pudding or agar and which gel is poor in its water-resisting property and is easily dispersed and dissolved in water].

In the present invention, a single polyvinyl alcohol component is used as a gel material (gelling component), but there may be co-existent inorganic or organic substances which do not impede the gelation of polyvinyl alcohol. Such inorganic or organic substances may be present in an amount of, for example, not more than 5 amount by weight, usually not more than one half of the amount by weight of polyvinyl alcohol. On the other hand, substances which act on polyvinyl alcohol (or modified polyvinyl alcohols such as polyvinyl acetal and polyvinyl butyral) to form a composite gel, and substances which react with polyvinyl alcohol and modifies the latter, even if their co-existent amounts are small, often exert an undesirable influence upon the gelation (gelation of a single polyvinyl alcohol component) in the present invention and make it difficult to obtain a gel of high water content superior in mechanical strength. As examples of such substances there may be mentioned the following substances whose interaction with polyvinyl alcohols are already known: colloidal alkali silicate [see U.S. Pat. No. 2,833,661 (1958)]; colloidal silica [U.S. Pat. No.2,833,661 (1958)]; organic silicon compounds [Saksan Vinyl Jushi, Nikkan Kogyo Shinbun-Sha (1962), p. 93]; tetraalkyl silicate [Japanese Patent Publications Nos.30358/1980 and 11311/1980]; boric acid and borax [French Pat. No.743942 (1933)]; phenol, naphthol, m-cresol, pyrogallol, salicylanilide, disalicylbenzidide, resorcinol and polyamines [Kobunshi Kagaku, 11, (105) 23 (1954)]; kaolin [Nature, 170, 461 (1955)]. The use of these substances should be avoided because they form a composite, inconvenient, weak gel with polyvinyl alcohol according to their amounts of co-existence.

As examples of the foregoing inorganic or organic substances which do not impede the gelation of polyvinyl alcohol, there may be mentioned active carbon, zeolite, ethylene glycol, propylene glycol, methyl alcohol, glycerin, enzymes, heparin (sodium salt or calcium salt), cane sugar, powdered chrysalis, ground shrimp, various medicines, agricultural chemicals and fertilizers, as well as polysaccharide and proteins such as agar, agarose, albumin, alginic acid and derivatives thereof, curdlan, carrageenan, casein, CMC (sodium cellulose glycolate), furcellaran, gelatin, methyl cellulose, pectin, starch, tamarind gum, tragacanth gum, xanthan gum and guar gum. In case ethylene glycol, propylene glycol, glycerin, methyl alcohol, cane sugar, glucose, agar, casein, agarose, alginic acid, carrageenan, CMC, gelatin, methyl cellulose, pectin, starch, tragacanth gum, xanthan gum and guar gum are used together with polyvinyl alcohol, the concentration of polyvinyl alcohol in an aqueous solution thereof may be decreased below 6 wt. %, e.g. 4–6 wt. %. As will be described later, co-existence of enzymes, powdered chrysalis, ground shrimp, other medicines, agricultural chemicals and fertilizers is very significant in such uses as immobilized enzymes, fish-luring agent, fishing baits, and medicine slow-releasing agent.

The appearance (color) of the gel of the present invention closely resembles that of silices of raw squid, rice cake, sweet rice jelly (white), fish cake and fresh fishes (white). In practising the present invention, however, desired colors of gels are obtainable by having substances of desired colors dissolved or suspended as an aqueous solution or fine powder beforehand in the aqueous polyvinyl alcohol solution, for example, phthalonitrile (usually available commercially, light reddish brown), Phthalocyanine Blue, Phthalocyanine Green, indanthron (blue), flavanthron (yellow), Oil Orange (Sudan.1, $\alpha$-phenylazo-$\beta$-naphthol), asbestos powder (gray), active carbon powder (black), silica-alumina (white), zeolite (white), aluminum silicate (white), starch (white), cellulose powder (white), albumin (white).

The sense of touch of the gel of the present invention is similar to that of human and animal meats, slices of raw squid, fish meat, rice cake, fish stick, minced and steamed fish, shao-mai and sausage. By selecting desired shapes of vessels or molds to be charged with the aqueous polyvinyl alcohol solution and, if required, by using the foregoing coloring substances, there can be obtained wet gels of desired colors and desired shapes (granular, filmy, lumpy, plate-like, cylindrical and any other shapes). The aqueous polyvinyl alcohol solution may be molded in conformity with the shape of the object product, or alternatively its molded article once obtained may be further molded into another shape by cutting or other means.

The gel of the present invention, even when compressed strongly, allows little water contained therein to exude. This notwithstanding, the application of air-drying treatment allows the gel to lose water gradually, become contracted and stiffen remarkably. Besides, even if the stiffened gel is thereafter immersed again in cold water, it never reverts to the original, highly hydrous state although slight water absorption and swelling are recognized (this phenomenon is similar to that observed in the muscles of animals, fish meat, squid and persimmon). Therefore, in order to retain the initial fresh appearance and touch, it is necessary to store the gel in a wet air atmosphere or immerse it in a physiologic saline solution or in water. But the aforesaid drying is slow, so also by immersing the gel in water every two or three days or by supplementing water into the gel by means of an injector, it is possible to retain the initial appearance (lively impression).

Powdered chrysalis or ground shrimp can be embedded in the gel of the present invention. That is, a hydrogel obtained by mixing and suspending a powdered chrysalis or ground shrimp into the aqueous polyvinyl alcohol solution of the present invention and subsequently applying the gelling treatment of the invention gives off a strong odor in the air and in water over a long period. Therefore, by hanging this hydrogel in water, it can be used as a fish-luring agent. In addition, by cutting it into small pieces and attaching it to a fish-hook, it can be used as a fishing bait having a strong odor and a fish meat-like appearance and being difficult to get out of shape and capable of being used repeatedly.

Steam, water and water-soluble low-molecular weight compounds such as ammonia, common salt, uric acid, urea, creatinine, glucose, lactic acid and antibiotics all permeate (penetrate) through the filmy gel of the present invention, but pathogenic bacteria do not permeate through this film. Therefore, this filmy gel can be used as a aseptic coating film. Moreover, the filmy gel of the present invention is so elastic that it can be applied also to expansible portion. For example, a filmy gel (0.2 mm thick) prepared according to the process of the present invention has an elongation in water of 37%, a strength in water of 100 g/mm$^2$ and a water vapor permeability of 530 g/m$^2$.24h.

The slowly releasing effect can be attained by embedding in the gel of the present invention various medicines [e.g. glaucoma remedy (pilocarpine), contraceptive luteohormone (progesterone), carcinostatic agent (5-FU, 5-fluorouracil)], agricultural chemicals (e.g. pyrethrin, sex pheromones, 2,2-dichlorovinyl dimethylphosphate), and fertilizers (e.g. tetramethylene pentaurea, isobutylidene diurea, oxamide, 2-oxy-4-methyl-6-ureidohexahydro pyrimidine), in addition to the heparin.

In the gel of the present invention there can be embedded an active carbon. Of course, the gel of the present invention can coat active carbon; besides, it is a more preferable material in preventing the leak of active carbon because it has a higher mechanical strength (abrasion resistance) than that of gelatin and poly(2-hydroxymethylmethacrylate).

It has heretofore been tried to embed in gel organic substances having physiological activity such as porphyrin, hemoglobin, chloroplast, enzymes by applying radiation to an aqueous polyvinyl alcohol solution or by applying thereto a gelling treatment using a cross-linking agent such as glutaraldehyde. Of course, the gel of the present invention also can embed (entrap) these organic substances. According to the process of the present invention, the gelling operation uses no γ-ray, reagent, or catalyst such as an acid or an alkali, and does not require heat treatment, either. Consequently, physiologically active substances are not damaged, particularly the higher-order structure of proteins can be retained as it is.

In the process for preparing a hydrogel of the present invention, no harmful chemical reagents are used and the mixing of enzymes can be made at room temperature (or lower). Besides, the gel can be molded into a thin film of about 50 μm in thickness and it is also easy to mold it into an enzyme pipe of 1 mm in inside diameter, or the like. The articles of the invention are superior in both water resistance and mechanical strength.

The reason why in the present invention there is obtained a gel quite different from conventional polyvinyl alcohol gels by freeze-molding and dehydrating an aqueous polyvinyl alcohol solution, is not clear, but this is presumed to be because at the time of freeze molding and subsequent partial dehydration treatment there are formed a large number of hydrogen bonds within and between the molecules of polyvinyl alcohol and particularly during the partial dehydration the crystallinity of the gel texture is enhanced thereby improving the mechanical strength and elasticity.

Anyhow, I was the first to find out such a frozen and dehydrated gel and its manufacturing process.

The following examples are given to further illustrate the present invention, but it is to be understood that the invention is not limited thereto.

EXAMPLE 1

86 g. powder (water content 7 wt. %) of a commercially available polyvinyl alcohol [degree of hydrolysis: 97 mol %, viscosity-average polymerization degree: 1,700, viscosity as a 4% aqueous solution: 20 cP (20° C.)] was dissolved in 914 g. of water to prepare a 8.0 wt. % aqueous solution thereof.

41 g. of this aqueous solution was poured into a beaker made of polyethylene (having a bottom diameter of 8 cm) and cooled (freeze-molded) at −50° C. for 0.7 hour, then vacuumdehydrated for 6 hours at 0.1 mmHg. After thawing, 8 g. (water content 58 wt. %; dehydration percentage, i.e. percentage reduction in weight of the frozen body by dehydration=80 wt. %) of a white, opaque gel was obtained. The gel was immersed in 10 ml. of tap water for 6 hours; as a result, it absorbed water and increased in weight to 14 g. (water content 76 wt. %). A load of 2 kg/cm$^2$ was imposed on this gel (0.3 mm thick), but the exudation of water was scarcely recognized (water retention 99%).

COMPARATIVE EXAMPLE 1

41 g. of the aqueous polyvinyl alcohol solution described in Example 1 was poured into a square vessel having a 8 cm×8 cm bottom and was allowed to stand at room temperature for 2 days; as a result, a colorless, transparent, weak and wet film was obtained. When this film was immersed in tap water for 6 hours, it was partially dissolved therein and the film itself exhibited stickiness. A rubbery gel as in the case of Example 1 was not formed at all.

COMPARATIVE EXAMPLE 2

The same procedure as in Example 1 was repeated except that a commercially available polyvinyl alcohol having a degree of hydrolysis of 78.5 mol %, a viscosity-average polymerization degree of 1,700 and a viscosity as a 4% aqueous solution of 30 cP (20° C.) was used in place of the polyvinyl alcohol used in Example 1. As a result, there was obtained 7.5 g. (water content 55 wt. %) of a freeze-molded and dried product which, after thawing, weakened even at 5° C. A small amount of gel layer and a large amount of a concentrated aqueous solution of polyvinyl alcohol were observed.

COMPARATIVE EXAMPLE 3

The polyvinyl alcohol used in Example 1 was substituted by a commercially available polyvinyl alcohol having a degree of hydrolysis of 99.2 mol %, a viscosity-average polymerization degree of 500 and a viscosity as a 4% aqueous solution of 5.6 cP (20° C.), and 20 g. of an 18 wt. % aqueous solution of the polyvinyl alcohol was subjected to freeze-molding and dehydrating in the same manner as in Example 1 to yield 13 g. (water content 72 wt. %) of gel which was fragile like agar. The gel proved to have little elasticity.

EXAMPLE 2

65 g. powder (water content 8 wt. %) of a commercially available polyvinyl alcohol [degree of hydrolysis: 99.4 mol %, viscosity-average polymerization degree: 2,600, viscosity as a 4% aqueous solution: 66 cP (20° C.)] was dissolved in 935 g. of water to prepare a 6 wt. % aqueous solution thereof. 170 g. of this aqueous solution was subjected to freeze-molding in the same manner as in Example 1 and then vacuum-dehydrated for 10 hours at 0.1 mmHg. After thawing, there was obtained 97 g. (water content 89 wt. %, dehydration percentage 43 wt. %) of a white, opaque gel rich in elasticity. When this gel (about 2 cm thick) was immersed in 100 ml. of tap water for 6 hours, it absorbed the water and increased in weight to 143 g. (water content 93 wt. %). A load of 2 kg/cm$^2$ was imposed on the gel, but the amount of water exuded was only 3 ml. (flow-out loss 2%).

COMPARATIVE EXAMPLE 4

The concentration of the same aqueous polyvinyl alcohol solution having a polymerization degree of 500 as in Comparative Example 3 was increased to 30 wt. %, and 120 g. of the aqueous solution thus concentrated was subjected to freeze-molding at −73° C. for 1 hour and then vacuum-dehydrated for 6 hours. 106 g. (water content 66 wt. %) of the freeze-molded and dehydrated product was thawed and then immersed in water for 8 hours; as a result, it absorbed water until its weight became 120 g. (water content 70 wt. %) and at the same time softened remarkably and partially got out of shape (dissolved into water).

EXAMPLE 3

10.9 g. (water content 8.5 wt. %) of the polyvinyl alcohol powder described in Example 2 was dissolved in 89 g. of water to prepare a 10 wt. % aqueous solution thereof. 90 g. of the so-prepared aqueous solution was poured into a Rasching ring (8 mm×8 mm) forming mold (for 2,900 pcs.) and cooled (freeze-molded) at −42° C. for 1 hour. Then, the upper cover of the mold was removed and vacuum-dehydrating was applied for 4 hours. After subsequent thawing, the molded Rasching ring-like gels were drawn out, which totalled 53 g. (water content 83 wt. %, dehydration percentage 41 wt. %).

A compressive stress of 2 kg/cm$^2$ was applied in the longitudinal direction against this gel and then removed. As a result, the shape of this elastic gel almost reverted to the original shape.

EXAMPLE 4

13 g. powder (water content 8.5 wt. %) of the polyvinyl alcohol described in Example 3 was dissolved in 89 g. of water to prepare a 11.6 wt. % aqueous solution thereof. 90 g. of the so-prepared aqueous solution was poured into a 1 cm×1 cm×5 cm plate forming mold (for 18 plates) and cooled (freeze-molded) at −53° C. for 1 hour. Then, the mold was disjointed and the molded product was removed and immediately subjected to vacuum-dehydrating for 6 hours to yield 48 g. of gel (water content 78 wt. %, dehydration percentage 47 wt. %). The gel was subjected to a tensile test, in which it did not break up to the stress of 5 kg/cm$^2$.

EXAMPLE 5

170. g. of a 6 wt. % aqueous solution prepared from the powdered polyvinyl alcohol described in Example 3 was divided into five equal portions, which were each poured into a polyethylene beaker (50 ml.), then cooled (freeze-molded) at −50° C. for 1 hour and thereafter vacuum-dehydrated for 1 to 14 hours. The dehydrated gels were immersed in water for 6 hours and then their weights were measured.

| Dehydrating time (h) | Dehydrated Gel | | | Immersed Gel | |
|---|---|---|---|---|---|
| | (g) | Water content (wt. %) | Dehydration percentage (wt. %) | (g) | Water content (wt. %) |
| 1 | 27 | 92 | 21 | 29 | 93 |
| 2 | 26 | 92 | 24 | 29 | 93 |
| 4 | 19 | 89 | 44 | 23 | 91 |
| 8 | 5 | 62 | 85 | 11 | 82 |
| 14 | 2.5 | 20 | 93 | 10 | 80 |

Furthermore, with respect to the gels after immersion, their tensile strengths were determined.

| Dehydrating Time | Strength (at break, kg/cm$^2$) |
|---|---|
| 1 | 1 |
| 2 | 2 |
| 4 | 3 |
| 8 | 5 |
| 14 | 6 |

When these gels were immersed in tap water and left standing for over 90 days at room temperature, they did not adhere to each other, did not get out of shape and underwent little change in strength.

COMPARATIVE EXAMPLE 5

In Example 5, 34 g. of a 6 wt. % aqueous solution of a polyvinyl alcohol (degree of hydrolysis: 99.4 mol %, viscosity-average polymerization degree: 2,600) was cooled (freeze-molded) and then allowed to stand for 1 hour at room temperature to give an opaque, pure-white, soft gel (34 g., dehydration percentage 0%, water content 94 wt. %). The gel was not elastic, and as to its tensile strength, it was broken at a tensile stress of only 100 g/cm$^2$. 10 g. of the gel was immersed in 30 ml. of water; as a result, in about 20 hours the gel began to get out of shape and the water layer became turbid, the greater part of which changed into a viscous water.

Thus, even if an aqueous polyvinyl alcohol solution is freeze-molded and then thawed, there merely is obtained a gel whose strength and water resistance are poor. After freeze-molding, unless drying (dehydration) is applied without thawing, the strong and water-resisting gel as referred to herein is not produced.

EXAMPLE 6

86 g. powder (water content 7 wt. %) of a commercially available polyvinyl alcohol [degree of hydrolysis: 97 mol %, viscosity-average polymerization degree: 1,700, viscosity as a 4% aqueous solution: 26 cP (20° C.)] was dissolved in 914 g. of water to prepare a 8.0 wt. % aqueous solution thereof.

Separately, 104 g. of a commercially available bentonite (powder for reagent, water content 15 wt. %) was dispersed in 1,500 g. of water to prepare a 5.5 wt. % aqueous suspension of bentonite.

35 g. of the above aqueous polyvinyl alcohol solution and 10 g. of the above aqueous bentonite suspension were mixed together. The concentration of polyvinyl alcohol and that of bentonite in the mixture were 6.2 wt. % and 1.3 wt. %, respectively. On the other hand, from the results of analysis of the bentonite powder (X-ray diffractiometry, differential thermal analysis, identification through an electron microscope, heat dehydration, interlaminar expansion by glycerin, cation exchange 89 meq/100 g., chemical analysis: SiO$_2$ 66.7, Al$_2$O$_3$ 8.7, Fe$_2$O$_3$ 3.1, CaO 0.3, MgO 1.6, Na$_2$O 3.2, K$_2$O 0.3, TiO$_2$ 0.0, MnO 0.0, P$_2$O$_5$ 0.0, H$_2$O 15 wt. %), its dry clay-minerals composition (wt. %) proves to be montmorillonite group 64, illites 1, talc 3, pyrophyllite 18 and vermiculite 1. Consequently, the concentration of three-layer type clay minerals in the above aqueous suspension is 1.1 wt. % and it is one-sixth of the concentration of polyvinyl alcohol. 45 g. of this aqueous suspension was poured into a polyethylene beaker (bottom diameter 8 cm), then cooled (freeze-molded) at −50° C. for 0.5 hour and thereafter vacuum-dehydrated for 4 hours. After thawing, there was obtained 9.8 g. of gel (water content 65 wt. %; dehydration percentage=78 wt. %). When the gel was immersed in 10 ml. of tap water, it absorbed water up to its weight of 15 g. (water content 77 wt. %). A load of 4 kg/cm$^2$ was imposed on the gel (about 3 mm thick), but the exudation of water was scarcely recognized (water retention 99%).

The foregoing commercial bentonite powder (2.0 g.) was subjected to the swelling ability test according to the Pharmacopoeia of Japan; that is, 100 ml. of water was charged into a graduated measuring cylinder and the above powder was added in 10 stages in such a manner that after the previously added powder had been precipitated almost completely the next powder portion was added. After the total amount of the powder was added, the beaker was left standing for 24 hours; as a result, the precipitation volume proved to be only 8 ml. far less than the specified value of 20 ml. (or more).

Likewise, the bentonite powder (6.0 g.) was subjected to the gel forming ability test as defined in the Pharmacopoeia of Japan; that is, the bentonite powder was mixed with 0.30 g. of magnesium oxide and the resulting mixture was added in several stages into 200 ml. of water, followed by shaking for 1 hour, then 100 ml. of the resulting suspension was taken out and allowed to stand for 24 hours. As a result, the amount of a transparent liquid separated as an upper layer was 12 ml. exceeding the specified value of 2 ml. (or less). Thus, the commercial bentonite used in this Example does not satisfy what is specified on this regard by the Pharmacopoeia of Japan, but the present invention is not affected at all as previously noted.

EXAMPLE 7

According to Example 6, 300 g. of a 8 wt. % aqueous polyvinyl alcohol solution and 130 g. of an aqueous bentonite suspension were prepared and then mixed together. The concentration of polyvinyl alcohol and that of bentonite in the mixture were 5.6 wt. % and 1.7 wt. %, respectively. 430 g. of the resulting aqueous suspension was poured into a glove formed of a polyethylene film, then the opening portion was closed with closure means and cooling (freeze-molding) was made at $-50°$ C. for 2 hours. Thereafter, the polyethylene film was stripped off and vacuum-dehydrating was applied for 8 hours to yield 204 g. of a frozen and dehydrated product (water content 85 wt. %, dehydration percentage 53 wt. %). After standing for 2 hours at room temperature to thaw the frozen molding, the molding was immersed in 200 ml. of tap water for 6 hours; as a result, its weight increased up to 220 g. (water content 86 wt. %).

This molded article was a very elastic, wet body, and even when an ordinary adult squeezed it strongly with both hands, there was little exudation of water (water retention 99%).

Then, this model (molding) was put in a transparent plastic case and, after covering the case, it was allowed to stand for one month, but there was no change in external appearance and in the touch with a finger tip (elasticity, volume). Thereafter, it was taken out of the case and allowed to stand (air-dried) in a room for 3 weeks; as a result, it remarkably contracted and stiffened, as reflected in the decrease of its weight from the foregoing 220 g. to only 33 g. (water content 5%).

That is, it is apparent that as much as about 85 wt. % of water was existent in the initial molded gel (model) and that it was contained firmly within the gel. Furthermore, it is difficult to regard this captured water as an immobilized, stable, chemically bonded water, it being apparent that it is discharged gradually.

EXAMPLE 8

85 g. powder (water content 6 wt. %) of a commercially available polyvinyl alcohol [degree of hydrolysis: 97 mol %, viscosity-average polymerization degree: 2,200, viscosity as a 4% aqueous solution: 54 cP ($20°$ C.)] was dissolved in 915 g. of water to prepare a 8.0 wt. % aqueous solution thereof.

Separately, 106 g. of a commercially available bentonite (powder for reagent, water content 17 wt. %) was dispersed in 1,490 g. of water to prepare a 5.5 wt. % aqueous suspension thereof.

Then, 100 g. of the above aqueous polyvinyl alcohol solution and 4 g. of the above aqueous bentonite suspension were mixed together. The concentration of polyvinyl alcohol and that of bentonite in the mixture were 7.6 wt. % and 0.2 wt. %, respectively. On the other hand, from the results of analysis of the above bentonite powder (X-ray diffractiometry, differential thermal analysis, identification through an electron microscope, heat dehydration, interlaminar expansion by glycerin, cation exchange: 78 meq/100 g., chemical analysis: $SiO_2$ 67.2, $Al_2O_3$ 6.8, $Fe_2O_3$ 4.1, CaO 0.3, MgO 1.6, $TiO_2$ 0.4, MnO 0.1, $P_2O_5$ 0.1, $Na_2O$ 3.2, $K_2O$ 0.4 wt. %), its dry clay-minerals composition (wt. %) proves to be montmorillonite group 58, illites 1, talc 1, pyrophyllite 11 and vermiculite 1. Consequently, the concentration of three-layer type clay minerals in the foregoing aqueous suspension is 0.14 wt. % and it is 1/54 of the conventration of polyvinyl alcohol. 104 g. of this aqueous suspension was poured into a polyethylene beaker having a bottom diameter of 8 cm, then cooled (freeze-molded) at $-63°$ C. for 0.5 hour and thereafter vacuum-dehydrated for 6 hours to yield 22 g. of gel (water content 60 wt. %, dehydration percentage 79 wt. %) The gel was immersed in 20 ml. of tap water for 6 hours; as a result, its weight increased to 25 g (water content 70 wt. %). When a load of 3 kg/cm$^2$ was imposed on this gel, the exudation of water was scarcely recognized (water retention 98%)

The commercial bentonite powder (2.0 g.) used in this Example was subjected to the swelling test as defined in the Pharmacopoeia of Japan, but the apparent volume of the resultant precipitate was much lower (9 ml.) than the specified value of 20 ml. (or higher) It was also subjected to the gel forming ability test according to the Pharmacopoeia of Japan; as a result, the amount of a transparent liquid separated as an upper layer barely reached the specified value of 2 ml. (or less).

EXAMPLE 9

84 g. powder (water content 5 wt. %) of a commercially available polyvinyl alcohol [degree of hydrolysis: 98.4 mol %, viscosity-average polymerization degree: 1,800, viscosity as a 4% aqueous solution 29.5 cP ($20°$ C.)] was dissolved in 916 g. of water to prepare a 8.0 wt. % aqueous solution thereof.

Separately, 100 g. of a commercially available bentonite (powder for reagent, water content 12 wt. %) was dispersed in 1,500 g. of water to prepare a 5.5 wt. % aqueous suspension thereof.

100 g. of the above aqueous polyvinyl alcohol solution and 10 g. of the above aqueous bentonite suspension were mixed together. The concentration of polyvinyl alcohol and that of bentonite in the mixture were 7.3 wt. % and 0.5 wt. %, respectively. On the other hand, from the results of analysis of the aforesaid bentonite powder (X-ray diffractiometry, differential thermal analysis, identification through an electron microscope, heat dehydration, interlaminar expansion by glycerin, cation exchange: 137 meq/100 g., chemical analysis: $SiO_2$ 71, $Al_2O_3$ 9, $Fe_2O_3$ 3, CaO 0.5, MgO 3, $TiO_2$ 0.5, $Na_2O$ 4, $K_2O$ 0.5, MnO 0.0, $P_2O_5$ 0.0, $H_2O$ 5 wt. %), its dry clay-minerals composition (wt. %) proves to be montmorillonite group 66, illites 1, talc 1, pyrophyllite 14 and vermiculite 1. Consequently, the concentration of three-layer type clay minerals in the above aqueous suspension is 0.4 wt. % and it is 1/18 of the concentration of polyvinyl alcohol.

110 g. of this aqueous suspension was poured into a polyethylene beaker (bottom diameter 8 cm), then cooled (freeze-molded) at $-40°$ C. for 0.5 hour and thereafter vacuum-dehydrated for 6 hours (dehydration percentage 80 wt. %). The gel after thawing was immersed in 20 ml. of tap water for 6 hours to yield 25 g. of water-absorbed gel (water content 65 wt. %). After a further immersion in the water for additional 3 days, the weight of the gel reached 35 g. (water content 75 wt. %). When a load of 47 g/mm$^2$ was imposed on the gel (about 7 mm thick), the gel did not collapse, and upon removal of the stress it reverted to the original shape.

The commercial bentonite powder (2.0 g.) used in this Example was subjected to the swelling test as defined in the Pharmacopoeia of Japan, but the precipitation volume was only 9 ml. not reaching the specified value of 20 ml. (or more). It was subjected also to the gel forming ability test according to the Pharmacopoeia of Japan, but the amount of a transparent liquid separated as an upper layer reached 14 ml. largely exceeding the specified value of 2 ml. (or less).

Thus, the three kinds of commercial bentonites used in Examples 6 through 9 do not satisfy what is specified by the Pharmacopoeia of Japan, but they are useful in the present invention as previously noted.

EXAMPLE 10

87 g. powder (water content 7 wt. %) of a commercially available polyvinyl alcohol [degree of hydrolysis: 97 mol %, viscosity-average polymerization degree: 1,700, viscosity as a 4% aqueous solution: 26 cP (20° C.)] was dissolved in 919 g. of water to prepare a 8 wt. % aqueous solution thereof.

Separately, 120 g. of a commercially available vermiculite powder (water content 9 wt. %) was dispersed in 1,200 g. of water to prepare a 8 wt. % aqueous suspension thereof.

120 g. of the above aqueous polyvinyl alcohol solution and 40 g. of the above aqueous vermiculite suspension were mixed together. The concentration of polyvinyl alcohol and that of vermiculite in the mixture were 6 wt. % and 2 wt. %, respectively. On the other hand, from the results of analysis of the vermiculite (powder), its dry clay-mineral composition (wt. %) proves to be montmorillonite group 4, illites 2, talc 3, pyrophyllite 2 and vermiculite 85 ($SiO_2$ 42, $Al_2O_3$ 19, $TiO_2$ 2, $Fe_2O_2$ 8, FeO 2, CaO 1, MgO 22, $K_2O$ 1, $Na_2O$ 1). Consequently, the concentration of three-layer type clay minerals in the above aqueous suspension is 1.9 wt. % and it is one-third of the concentration of polyvinyl alcohol. 160 g. of this aqueous suspension was poured into a polyethylene beaker having a bottom diameter of 8 cm, then cooled (freeze-molded) at −80° C. for 0.5 hour and thereafter vacuum-dehydrated for 6 hours. After thawing there was obtained 54 g. of gel (water content 76 wt. %, dehydration percentage 66 wt. %). The gel was immersed in 50 ml. of tap water; as a result, its weight increased to 74 g. (water content 83 wt. %). When a load of 53 g/mm² was imposed on the gel, the gel did not collapse, and upon removal of the stress it reverted to the original shape.

EXAMPLE 11

85 g. powder (water content 6 wt. %) of a commercially available polyvinyl alcohol [degree of hydrolysis: 97 mol %, viscosity-average polymerization degree: 2,200, viscosity as a 4% aqueous solution: 54 cP (20° C.)] was dissolved in 914 g. of water to prepare a 8 wt. % aqueous solution thereof.

Separately, 80 g. of illite (obtained in Ohta City, Shimane Prefecture, Japan, water content 8 wt. %) was dispersed in 250 g. of water to prepare a 22 wt. % aqueous suspension.

360 g. of the above aqueous polyvinyl alcohol solution and 80 g. of the above aqueous illite suspension were mixed together. The concentration of polyvinyl alcohol and that of illite in the mixture were 6.5 wt. % and 4 wt. %, respectively. From the results of analysis of the illite (powder), its dry clay-minerals composition (wt. %) proves to be montmorillonite group 1, illites 87, talc 1, pyrophyllite 6 and vermiculite 1 ($SiO_2$ 52, $Al_2O_3$ 24, $Fe_2O_3$ 3, FeO 3, MgO 4, CaO 1, $K_2O$ 7, $Na_2O$ 1, $TiO_2$ 1, $Mn_2O_3$ 2). Consequently, the concentration of three-layer type clay minerals in the above aqueous suspension is 3.8 wt. % and it is one half of the concentration of polyvinyl alcohol.

440 g. of the aqueous suspension thus obtained was poured into a mold for molding 1,160 hollow cylinders (Raschig rings) each 8 mm in outside diameter, 4 mm in inside diameter and 8 mm in length and then cooled (freeze-molded) at −50° C. for 0.5 hour. Thereafter, the upper cover of the mold was removed and the lower cover supporting the moldings (Raschig rings) was vacuum-dehydrated for 9 hours. After thawing, there was obtained 94 g. of molded gel (water content 51 wt. %, dehydration percentage 79 wt. %).

When a longitudinal stress of 34 g/mm² was applied to the Raschig rings thus formed, the rings did not collapse, and upon removal of the load they reverted to the original shape.

EXAMPLE 12

An 8 wt. % aqueous polyvinyl alcohol solution was prepared according to Example 6.

Separately, 30 g. of the bentonite powder described in Example 6 was dispersed in 560 g. of an aqueous sodium pyrophosphate solution ($Na_4P_2O_7 \cdot 10H_2O$ 10.7 wt. %) to prepare a 4.5 wt. % aqueous bentonite suspension.

110 g. of the above aqueous polyvinyl alcohol solution and 125 g. of the above aqueous bentonite suspension were mixed together. The concentration of polyvinyl alcohol and that of bentonite in the mixture were 3.7 wt. % and 2.3 wt. %, respectively. In this case, the concentration of three-layer type clay minerals is 2.0 wt. % (that is, one half of the concentration of polyvinyl alcohol).

235 g. of this aqueous suspension was poured into a polyethylene beaker (8 cm in diameter), then cooled (freeze-molded) at −63° C. for 0.5 hour and thereafter vacuum-dehydrated for 6 hours. After thawing, there was obtained 75 g. of gel (water content 81 wt. %, dehydration percentage 68 wt. %). When a load of 4 kg/cm² was applied to the gel, there was no exudation of water.

EXAMPLE 13

15 g. of the aqueous polyvinyl alcohol solution prepared in Example 6 and 100 g. of the aqueous bentonite suspension prepared in Example 7 were mixed together. The concentration of polyvinyl alcohol and that of bentonite in the mixture were 1 wt. % and 4 wt. %, respectively. The concentration of three-layer type clay minerals in the aqueous suspension thus obtained is 3.4 wt. % (one-third of the concentration of polyvinyl alcohol).

115 g. of this aqueous suspension was poured into a cylinder having a bottom diameter of 2 cm, then cooled (freeze-molded) at −74° C. for 0.5 hour and thereafter vacuum-dehydrated for 6 hours. After thawing, there was obtained 27 g. of gel (water content 79 wt. %, dehydration percentage 77 wt. %). When a load of 1 kg/cm² was applied to the gel, only a very small amount of water exuded (water retention 98%)

EXAMPLE 14

87 g. powder (water content 7 wt. %) of a commercially available polyvinyl alcohol [degree of hydrolysis: 97 mol %, viscosity-average polymerization degree: 1,700, viscosity as a 4% aqueous solution: 26 cP (20° C.)] was dissolved in 920 g. of water to prepare a 8 wt % aqueous solution thereof.

Separately, 120 g. of a commercially available talc (water content 14 wt. %) was dispersed in 1,190 g. of water to prepare an 8 wt. % aqueous suspension.

265 g. of the above aqueous polyvinyl alcohol solution and 250 g. of the above aqueous talc suspension were mixed together Ihe concentration of polyvinyl alcohol and that of talc in the mixture were 4 wt % and 3.8 wt. %, respectively.

On the other hand, from the results of analysis of the talc (powder), its dry clay-minerals composition (wt. %) proves to be montmorillonite group 6, illites 2, talc 87, pyrophyllite 2 and vermiculite 1 (MgO 32, $SiO_2$ 64, $Al_2O_3$ 1, CaO 0.3, $K_2O$ 0.3, $Na_2O$ 0.7, $Fe_2O_3$ 0.5). Consequently, the concentration of three-layer type clay minerals in the above aqueous suspension is 3.7 wt. % (about the same amount as that of polyvinyl alcohol).

515 g. of this aqueous suspension was poured into a mold for molding (two) columns (8 cm in diameter, 4 cm in height) and then cooled (frozen) at −76° C. for 1.5 hours. Thereafter, the molded articles were taken out of the mold and vacuum-dehydrated for 6 hours. After thawing, a total of 142 g. of gel (two columns, water content 70 wt. %, dehydration percentage 72 wt. %) was obtained. A load of 3 kg/cm$^2$ was applied in the longitudinal (height) direction of the columns, but there was little exudation of water (water retention 98%).

EXAMPLE 15

65 g. powder (water content 8 wt. %) of a commercially available polyvinyl alcohol [degree of hydrolysis: 99.4 mol %, viscosity-average polymerization degree: 2,600, viscosity as a 4% aqueous solution: 66 cP (20° C.)] was dissolved in 935 g. of water to prepare a 6 wt. % aqueous solution thereof. 170 g. of this aqueous solution was poured into a polyethylene beaker (bottom diameter 8 cm), then cooled (freeze-molded) at −50° C. for 0.7 hour and thereafter vacuum-dehydrated for 6 hours.

After thawing, there was obtained 97 g. (water content 89 wt. %, dehydration percentage 43 wt. %) of a white, opaque gel rich in elasticity. The gel (about 2 cm thick) was immersed in 100 ml. of tap water for 6 hours; as a result, it absorbed water and increased in weight to 143 g. (water content 93 wt. %). A load of 4 kg/cm$^2$ was applied to the gel, but the amount of water exuded was only 3 ml. (flow-out loss 2%).

EXAMPLE 16

86 g. powder (water content 7 wt. %) of a commercially available polyvinyl alcohol [degree of hydrolysis: 97 mol %, viscosity-average polymerization degree: 1,800, viscosity as a 4% aqueous solution: 28 cP (20° C.)] was dissolved in 914 g. of water to prepare an 8 wt. % aqueous solution thereof.

41 g. of this aqueous polyvinyl alcohol solution was freeze-molded according to Example 15 and then vacuum-dehydrated for 10 hours. After thawing, there was obtained 8 g. (water content 58 wt. %, dehydration percentage 80 wt. %) of a white, opaque gel. The gel was immersed in 10 ml. of tap water for 6 hours; as a result, it absorbed water and increased in weight to 14 g. (water content 76 wt. %). A load of 4 kg/cm$^2$ was applied to the gel (0.3 mm thick), but there was little exudation of water (water retention 99%).

EXAMPLE 17

10.9 g. powder (water content 8.5 wt. %) of the polyvinyl alcohol described in Example 15 was dissolved in 89 g. of water to prepare a 10 wt. % aqueous solution thereof. 90 g. of this aqueous solution was poured into a mold for molding Raschig rings (2,900 pcs.) (each 8 mm × 8 mm) and cooled (freeze-molded) at −42° C. for 1 hour. Then, the upper cover of the mold was removed and vacuum dehydrating was applied for 4 hours. After thawing, Raschig ring-like molded gels were drawn out. A total of 53 g. (water content 83 wt. % dehydration percentage 41 wt. %) of gel was obtained.

A compressive stress of 4 kg/cm$^2$ was applied in the longitudinal direction of the gel, but upon removal of the stress the shape of this elastic gel almost reverted to the original shape.

EXAMPLE 18

13 g. of the same polyvinyl alcohol powder (water content 8.5 wt. %) as that used in Example 17 was dissolved in 89 g. of water to prepare a 11.6 wt. % aqueous solution thereof. 90 g. of this aqueous solution was poured into a mold for molding plates (18 pcs.) (each 1 cm × 1 cm × 5 cm) and cooled (freeze-molded) at −53° C. for 1 hour. Then, the mold was disjointed and the molded articles were taken out and immediately subjected to vacuum dehydration for 6 hours to yield 48 g. of gel (water content 78 wt. %, dehydration percentage 47 wt. %). The gel was subjected to a tensile test, in which it did not break up to the stress of 6 kg/cm$^2$.

COMPARATIVE EXAMPLE 6

41 g. of the same aqueous polyvinyl alcohol solution as that prepared in Example 16 was poured into a square vessel having a bottom 8 cm by 8 cm and allowed to stand for 2 days at room temperature. As a result, a colorless, transparent, weak, wet film was obtained. When this film was immersed in tap water for 6 hours, it partially dissolved in the water and the film itself exhibited stickiness. Such a rubbery gel as in Example 16 was not produced at all. That is, even if an aqueous polyvinyl alcohol solution is merely dried, the rubbery and very hydrous gel of the present invention is not obtained.

COMPARATIVE EXAMPLE 7

The same procedure as in Example 16 was repeated except that in place of the polyvinyl alcohol used therein there was employed a commercially available polyvinyl alcohol having a degree of hydrolysis of 78.5 mol %, a viscosity-average polymerization degree of 1,800 and a viscosity as a 4% aqueous solution of 36 cP (20° C). As a result, there was obtained 7.4 g. of a freeze-molded and dehydrated product (water content 55 wt. %) which, after thawing, weakened even at 5° C. A small amount of gel layer and a large amount of a concentrated aqueous polyvinyl alcohol solution were cloven. Thus, even if a polyvinyl alcohol of a low saponification degree is used, the water-resisting gel of the present invention is not obtainable.

COMPARATIVE EXAMPLE 8

In place of the polyvinyl alcohol used in Example 16 there was employed a commercially available polyvinyl alcohol having a degree of hydrolysis of 99.2 mol %, a viscosity-average polymerization degree of 500 and a viscosity as a 4% aqueous solution of 5.6 cP (20° C.). 20 g. of its 18 wt. % aqueous solution was freeze-molded and dehydrated in the same manner as in Example 16, but there was merely obtained 13 g. of an agar-like, fragile gel (water content 72 wt. %), which proved to have little elasticity. Thus, even if a polyvinyl alcohol of a low polymerization degree is used, the rubbery, elastic gel superior in mechanical strength of the present invention is not obtained.

COMPARATIVE EXAMPLE 9

The concentration of the same aqueous polyvinyl alcohol solution having a polymerization degree of 500 as in Comparative Example 8 was increased to 30 wt. %, and 120 g. of the aqueous solution thus concentrated was subjected to freeze-molding at $-73°$ C. for 1 hour and then vacuum-dehydrated for 6 hours. 106 g. of the freeze-molded and dehydrated product (water content 66 wt. %) was thawed and then immersed in water for 8 hours; as a result, it absorbed water up to its weight of 120 g. (water content 70 wt. %), softened remarkably and partially got out of shape (dissolved into water).

COMPARATIVE EXAMPLE 10

In Example 5, 34 g. of a 6 wt. % aqueous solution of polyvinyl alcohol (degree of hydrolysis: 99.4 mol %, viscosity-average polymerization degree: 2,600) was cooled (freeze-molded) and then allowed to stand for 1 hour at room temperature to give a sticky, soft gel (34 g., dehydration percentage 0%, water content 94 wt. %). The gel was not elastic, and as to its tensile strength, it was broken at a tensile stress of only 100 g/cm$^2$. 10 g. of the gel was immersed in 30 ml. of water; as a result, in about 20 hours the gel began to get out of shape and the water layer became turbid, the greater part of which changed into a viscous water.

Thus, even if an aqueous polyvinyl alcohol solution is freeze-molded and then thawed, there merely is obtained a sticky gel whose strength and water resistance are poor. After freeze-molding, unless dehydration is applied without thawing, the strong and water-resistant gel as referred to herein is not produced.

COMPARATIVE EXAMPLE 11

0.5 g. powder (water content 8.5 wt. %) of the polyvinyl alcohol described in Example 15 and 0.5 g. of carboxymethyl cellulose were added into 90 g. of water, dissolved by boiling for 15 minutes, allowed to cool down to room temperature, stirred vigorously, and then cooled (frozen) at $-50°$ C. for 10 hours, immediately followed by vacuum dehydrating, to obtain 1 g. of a dehydrated product. This dehydrated product, which was a white sponge in the form of and more fragile than a foamed styrol, wss easily converted in water to a viscous liquid.

Thus, even if an about 0.5% aqueous polyvinyl alcohol solution is treated according to the present invention, there merely is obtained a water-soluble product.

EXAMPLE 19

20 g. powder (water content 8.5 wt. %) of the polyvinyl alcohol described in Example 15 was dissolved in 170 g. of water to prepare a 9.6 wt. % aqueous solution thereof. Then, 9.5 g. of a commercially available chrysalis powder (a product of Oguchi Yuhi Co.) was mixed and suspended in 85 g. of the so-prepared aqueous solution and the resulting suspension was poured into a vessel having a bottom 15 cm by 21 cm. Then, immediately after freezing at $-50°$ C. for 2 hours, vacuum dehydration was applied.

After thawing, 44 g. (dehydration percentage 54 wt. %, water content 60 wt. %) of a plate-like hydrogel was obtained, which was then immersed in water for 4 hours to yield 61 g. (water content 71 wt. %) of hydrogel.

EXAMPLE 20

2.2 g. powder (water content 8.5 wt. %) of the polyvinyl alcohol described in Example 15, 114 mg. of disodium hydrogenphosphate, 73 mg. of potassium dihydrogenphosphate and 20 mg. of glycerin were dissolved in 20 ml. of water to prepare a 10 wt. % aqueous polyvinyl alcohol solution of pH 7.0, which was sterilized with steam under high pressure (120° C. for 20 minutes). The sterilized aqueous solution was cooled to 5° C., in which was then dissolved 200 mg. of urease (urea amidohydrolase, P-L Biochemicals Inc., obtained from jack bean, preserved at 5° C.). 5.5 g. of the resulting solution was poured into a presterilized, pipe forming mold having an inside diameter of 1 mm, an outside diameter of 6 mm and a length of 20 cm and frozen at $-50°$ C. for 3 hours. Then, the upper cover of the mold was removed and vacuum dehydration was applied immediately to obtain 3 g. (dehydration percentage 45 wt. %, water content 82 wt. %) of an enzyme pipe. The pipe was immersed for 6 hours in a pre-sterilized buffer solution of pH 7.05 consisting of 360 mg. of potassium dihydrogenphosphate, 570 mg. of disodium hydrogenphosphate, 100 mg. of glycerin and 100 ml. of water. As a result, there was obtained 4 g. (water content 86 wt. %) of an enzyme pipe having an inside diameter of 1 mm and an outside diameter of 5 mm. In consideration of the conditions for using a medicodiagnostic enzyme pipe [see Hiromi Kitano, Life Science no Genjo to Syorai, Sozo, Co., Ltd. 87 (1981)], a cyanoacrylate resin liquid for rapid cure adhesives was applied throughout the outer peripheral wall of the aforesaid hydrogel pipe.

EXAMPLE 21

86 g. powder (water content 7 wt. %) of a commercially available polyvinyl alcohol [degree of hydrolysis: 97 mol %, viscosity-average polymerization degree: 1,700, viscosity as a 4% aqueous solution: 26 cP (20° C.)] was dissolved in 914 g. of water to prepare an 8 wt. % aqueous solution thereof.

41 g. of the aqueous polyvinyl alcohol solution was poured onto a projections-disposed plate 48 cm by 17 cm made of polyethylene (height of projection: 1 mm, projection density: 74,000 pcs/m$^2$, shape of projection: a 1.8 mm-dia. column, percentage total area occupied by projections: 20%) and spread uniformly with a spatula (application thickness 0.7 mm), followed by cooling (freeze-molding) at $-50°$ C. for 0.7 hour and subsequent vacuum dehydrating for 4 hours. After thawing, 4.4 g. (water content 25 wt. %, dehydration percentage =89 wt. %) of a white, opaque gel (net) was obtained. The gel was immersed in 40 ml. of tap water for 6 hours; as a result, it absorbed the water up to its weight of 26.1 g. (water content 87 wt. %).

The net-like gel after wetting was uniformly white and translucent throughout its surface, and its apparent tensile strength reached 1 kg/cm$^2$.

COMPARATIVE EXAMPLE 12

In Example 21, the aqueous polyvinyl alcohol solution was applied onto the projections-disposed plate and then allowed to stand overnight at room temperature to yield 4.1 g. of a colorless, transparent, perforated, thin film (water content 20 wt. %, thickness 0.07 mm). This film, when immersed in 20 ml. of tap water for 8 hours, increased in weight to 11.1 g. (water content 70 wt. %), and at the same time a small amount of polyvinyl alcohol was dissolved out into the water. Moreover, the film was completely lacking in stiffness, was very weak like a wet cellophane paper and got out of shape completely to the extent that the shape of a perforated plate could no longer be recognized. Thus, even if the aqueous polyvinyl alcohol solution is air-dried on the projections-disposed plate, there merely is obtained a weak film inferior in water resistance.

EXAMPLE 22

65 g. powder (water content 8 wt. %) of a commercially available polyvinyl alcohol [degree of hydrolysis: 99.4 mol %, viscosity-average polymerization degree: 3,300, viscosity as a 4% aqueous solution: 125 cP (20° C.)] was dissolved in 935 g. of water to prepare a 6 wt. % aqueous solution thereof. 170 g. of this aqueous solution was poured onto a projections-disposed plate 48 cm by 27 cm made of stainless steel (height of projection: 1.5 mm, projection density: 74,000 pcs/m$^2$, shape of projection: a 1.8 mm-dia. column, percentage total area occupied by projections: 20%) and spread uniformly with an aluminum plate (27 cm×4 cm×0.1 cm) to a thickness of 1.3 mm. Then, after cooling (freeze-molding) for 0.7 hours, vacuum dehydrating was applied for 5 hours. After thawing, 13.7 g. (water content 25 wt. %, dehydration percentage 92 wt. %) of a white, opaque gel (net) was obtained. The gel was immersed in 15 ml. of a 0.9 wt. % saline solution for 6 hours; as a result, it absorbed water and increased in weight to 64 g. (water content 84 wt. %). The net-like gel after wetting was uniformly white and translucent throughout its surface, and its apparent tensile strength reached 2 kg/cm$^2$.

EXAMPLE 23

10.9 g. powder (water content 8.5 wt. %) of the polyvinyl alcohol described in Example 22 was dissolved in 89 g. of water to prepare a 10 wt. % aqueous solution thereof. 90 g. of this aqueous solution was poured onto a projections-disposed plate 130 cm by 17 cm made of polyurethane rubber (height of projection: 1 mm, projection density: 74,000 pcs/m$^2$, shape of projection: a 1.8 mm-dia. column, percentage total area occupied by projections: 20%) and spread uniformly with a spatula to a thickness of 0.7 mm. Then, after cooling (freeze-molding) at −58° C. for 0.7 hour, vacuum dehydrating was applied for 4 hours. After thawing, 11 g. (water content 18 wt. %, dehydration percentage 88 wt. %) of a white, opaque gel was obtained. The gel was immersed in 20 ml. of tap water; as a result, it absorbed the water and increased in weight to 51 g. (water content 82 wt. %). The net-like gel after wetting was uniformly white and translucent throughout its surface, and its apparent tensile strength reached 3 kg/cm$^2$.

EXAMPLE 24

86 g. powder (water content 7 wt. %) of the polyvinyl alcohol described in Example 22 was dissolved in 914 g. of water to prepare an 8 wt. % aqueous solution thereof. Separately, 104 g. of a commercially available bentonite (powder for reagent, water content 15 wt. %) was dispersed in 1,500 g. of water to prepare a 5.5 wt. % aqueous suspension thereof.

35 g. of the above aqueous polyvinyl alcohol solution and 10 g. of the above aqueous bentonite suspension were mixed together. The concentration of polyvinyl alcohol and that of bentonite in the mixture were 6.2 wt. % and 1.3 wt. %, respectively. On the other hand, from the results of analysis of the bentonite powder (X-ray diffractiometry, differential thermal analysis, identification through an electron microscope, heat dehydration, interlaminar expansion by glycerin, cation exchange: 89 meq/l00g., chemical analysis: SiO$_2$ 66.7, AlO$_3$ 8.7, Fe$_2$O$_3$ 3.1, CaO 0.3, MgO 0.16, Na$_2$O 3.2, K$_2$O 0.3, TiO$_2$ 0.0, MnO 0.0, P$_2$O$_5$ 0.0, H$_2$O 15 wt. %), its dry clay-minerals composition (wt. %) proves to be montmorillonite group 64, illites 1, talc 3, pyrophyllite 18 and vermiculite 1. Consequently, the concentration of three-layer type clay minerals in the above aqueous suspension is 1 wt. % and it is one-sixth of the concentration of polyvinyl alcohol. 45 g. of this aqueous suspension was poured onto a projections-disposed plate 40 cm by 129 cm made of epichlorohydrin rubber (height of projection: 0.1 mm, projection density: 500,000 pcs/m$^2$, shape of projection: needle-like 0.4 mm in diameter, percentage total area occupied by the bottom portions of projections: 6%) and spread uniformly with an aluminum plate (40 cm×4 cm×0.1 cm) to a thickness of 0.09 mm. Then, after freeze-molding at −65° C. for 0.6 hour, vacuum dehydrating was applied for 4 hours.

After thawing, 5.1 g. (water content 33 wt. %, dehydration percentage 89 wt. %) of a white, opaque gel (net) was obtained. The gel was immersed in 10 ml. of tap water for 8 hours; as a result, it absorbed the water and increased in weight to 32 g. (water content 89 wt. %). The gel after wetting was uniformly white and translucent throughout its surface, and its apparent tensile strength reached 2 kg/cm$^2$.

The foregoing commercial bentonite powder (2.0 g.) was subjected to the swelling ability test as defined in the Pharmacopoeia of Japan in such a manner that 100 ml. of water was charged into a graduated measuring cylinder and then the said powder was added in 10 stages, provided that after the previouslyadded powder had precipitated almost completely, the next powder portion was added. After addition of the total amount of the powder, the measuring cylinder was allowed to stand for 24 hours. As a result, the precipitation volume was only 8 ml. far less than the specified value of 20 ml. (or higher).

Likewise, the bentonite powder (6.0 g.) was subjected to the gel forming ability test according to the Pharmacopoeia of Japan. That is, the powder was mixed with 0.30 g. of magnesium oxide, then the resulting mixture was added into 100 ml. of water in several stages. After shaking for 1 hour, 100 ml. of the resultant suspension was sampled and allowed to stand for 24 hours. As a result, the amount of a transparent liquid separated as an upper layer was 12 ml. exceeding the specified value of 2 ml. (or less). Thus, the commercial bentonite used in this Example does not satisfy what is defined by the Pharmacopoeia of Japan, but may be used in the present invention without any trouble.

EXAMPLE 25

87 g. powder (water content 7 wt. %) of a commercially available polyvinyl alcohol [degree of hydrolysis: 99.5 mol %, viscosity-average polymerization degree: 1,700, viscosity as a 4% aqueous solution 26 cP (20° C.)] was dissolved in 919 g. of water to prepare an 8 wt. % aqueous solution thereof. Separately, 120 g. of a commercially available vermiculite powder (water content 9 wt. %) was dispersed in 1,200 g. of water to prepare an 8 wt. % aqueous suspension thereof.

120 g. of the above aqueous polyvinyl alcohol solution and 40 g. of the above vermiculite suspension were mixed together. The concentration of polyvinyl alcohol and that of vermiculite in the mixture were 6 wt. % and 2 wt. %, respectively. On the other hand, from the results of analysis of the vermiculite (powder), its dry clay-minerals composition (wt. %) proves to be montmorillonite group 4, illites 2, talc 3, pyrophyllite 2 and vermiculite 85 ($SiO_2$ 42, $Al_2O_3$ 19, $TiO_2$ 2, $Fe_2O_2$ 8, FeO 2, CaO 1, MgO 22, $K_2O$ 1, $Na_2O$ 1). Consequently, the concentration of three-layer type clay minerals in the above aqueous suspension is 1.9 wt. % and it is one-third of the concentration of polyvinyl alcohol. 160 g. of this aqueous suspension was poured onto a projections-disposed plate 10 cm by 50 cm made of nitrile rubber (height of projection: 4 mm, projection density: 3,100 pcs/$m^2$, shape of projection: a 6 mm-dia. column, percentage total area occupied by projections: 9%) and spread uniformly with an aluminum plate (10 cm×4 cm×0.3 cm) to a thickness of 3.5 mm. Then, after freeze-molding at −62° C. for 0.7 hour, vacuum dehydrating was applied for 7 hours. After thawing, 52 g. (water content 75 wt. %, dehydration percentage 67 wt. %) of a white, opaque gel (perforated plate) was obtained. The gel was immersed in 50 ml. of tap water for 6 hours; as a result, the gel (perforated plate) absorbed the water up to its weight of 73 g. (water content 82 wt. %). The gel after wetting was uniformly white and opaque, and its apparent tensile strength reached 2 kg/$cm^2$.

What is claimed is:

1. A process for preparing a water-insoluble hydrogel which comprises the steps: preparing a 3 to 25 weight % aqueous solution of a polyvinyl alcohol having a degree of hydrolysis not less than 95 mol % and a viscosity-average polymerization degree of not less than 1,500, pouring said aqueous polyvinyl alcohol solution into a desired shape of a vessel or a mold, freeze-molding said poured aqueous polyvinyl alochol solution at a temperature lower than −6° C., vacuum-dehydrating the resulting molded article without thawing it to a dehydration percentage not lower than 5 weight %, and thawing said dehydrated article to provide a water-insoluble hydrogel having a water content of 20 to 92% by weight.

2. A process according to claim 1, in which clay minerals of a laminated structure having a three-layer type (2:1 type) composite layer as a basic unit are suspended in said aqueous polyvinyl alcohol solution in an amount of not more than five times by weight the amount of said polyvinyl alcohol.

3. A process according to claim 2, in which the degree of hydrolysis of said polyvinyl alcohol is not less than 97 mol %.

4. A process according to claim 1 or claim 2, in which the viscosity-average polymerization degree of said polyvinyl alcohol is in the range of from 1,800 to 2,600.

5. A process according to claim 1 or claim 2, in which the freeze-molding temperature is lower than −15° C.

6. A process according to claim 2, in which the mixing ratio of said polyvinyl alcohol to said clay minerals is in the range of 5/1 to 15/1.

7. A process according to claim 2, in which said clay minerals principally comprise montmorillonite, vermiculite, illite, pyrophyllite, or talc.

8. A process according to claim 2, in which said clay minerals have a particle size not larger than 0.15 mm.

9. A process according to claim 1 or claim 2, in which said vessel or mold is a plate having 900 to 500,000 pieces of projections per square meter.

10. A process according to claim 9, in which said plate is a flat plate or a curved plate.

11. A process according to claim 9, in which the aqueous solution is applied onto said plate so that the applied thickness is in the range of 0.01 to 5 mm.

12. A process according to claim 1 or claim 2, in which the resulting hydrogel is further immersed in water until its water content reaches 50 to 95 weight % on a wet body basis.

* * * * *